US006724842B1

(12) United States Patent
Hochwald et al.

(10) Patent No.: US 6,724,842 B1
(45) Date of Patent: Apr. 20, 2004

(54) METHOD FOR WIRELESS DIFFERENTIAL COMMUNICATION USING MULTIPLE TRANSMITTER ANTENNAS

(75) Inventors: Bertrand Hochwald, Summit, NJ (US); Wim Sweldens, New Providence, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/356,387

(22) Filed: Jul. 16, 1999

(51) Int. Cl.$^7$ ................................................. H04B 7/10
(52) U.S. Cl. ...................... 375/347; 375/240; 375/260; 375/299; 370/334
(58) Field of Search ................................ 375/347, 260, 375/299, 240; 370/334

(56) References Cited

U.S. PATENT DOCUMENTS 5,109,392 A  *  4/1992  McDonald ................... 375/331
6,363,121 B1 *  3/2002  Hochwald et al. ........... 375/260

OTHER PUBLICATIONS

Tarokh et al ("A differential detection scheme for transmit diversity," IEEE J. Sel. Areas Commun., vol. 17, pp.451–460, Mar. 1999.).*
I.E. Telatar, "Capacity of Multi–Antenna Gaussian Channels," Tech. Rep. BL0112170–950615–07TM, Bell Laboratories, Lucent Technologies, 1995.
G.J. Foschini, "Layered Space–Time Architecture for Wireless Communication in a Fading Environment When Using Multi–Element Antennas," Bell Labs, Tech. J., vol. 1 No. 2, pp. 41–59, 1996.

B.M. Hochwald, et al., "Unitary Space–Time Modulation for Multiple–Antenna Communication in Rayleigh Flat Fading," Tech. Rep. BL0112170–980512–07TM, Bell Laboratories, Lucent Technologies, 1998.

Hochwald, et al., "Systematic Design of Unitary SpaceTime Constellations," Tech Rep. BL0112170–980914–27TM, Bell Laboratories, Lucent Technologies, 1998.

Marzetta, et al., "Capacity of a Mobile Multiple–Antenna Communication Link in Rayleigh Flat Fading," IEEE Trans. Inf. Thy., vol. 45, pp. 139–157, 1999.

Tarokh, et al., "Space–Time Block Codes From Orthogonal Designs," IEEE Trans. Inf. Thy., vol. 45, No. 5, pp. 1456–1467, Jul. 1999.

Tarokh, et al., "Space–Time Codes for High Data Rate Wireless Communication: Performance Criterion and Code Construction," IEEE Trans. Inf. Thy., vol. 44, pp. 744–765.

* cited by examiner

*Primary Examiner*—Stephen Chin
*Assistant Examiner*—Guillermo Muñoz (57) ABSTRACT

The method of differential communication for multiple transmitter antennas generalizes conventional coding of information in the phase shift between successive complex scalars signals used in single antenna communication to signals that are complex matrices. Each column of such a matrix represents a time sequence of signals emitted by a respective antenna of a multiple transmitter array. Preferably, the signal matrices are unitary matrices that form at least part of a finite group under multiplication. Data is encoded by making each transmitted signal the product of the previous signal and a selected one of the signal matrices.

27 Claims, 3 Drawing Sheets

$$\begin{bmatrix} I \\ V_{z1} \end{bmatrix} \begin{bmatrix} I \\ V_{z2} \end{bmatrix} \begin{bmatrix} I \\ V_{z3} \end{bmatrix} \cdots$$

$$\begin{bmatrix} S_0 \\ S_1 \\ S_2 \\ S_3 \\ \vdots \end{bmatrix} \begin{matrix} \text{---} \\ \text{---} \\ \text{---} \\ \text{---} \end{matrix} \begin{bmatrix} V_{y0} \\ V_{y1} \end{bmatrix} \begin{bmatrix} V_{y1} \\ V_{y2} \end{bmatrix} \begin{bmatrix} V_{y2} \\ V_{y3} \end{bmatrix} \cdots$$

FIG. 4

| M | R | L | δ | [u₁ u₂ ··· u_N] |
|---|---|---|---|---|
| 2 | 1 | 4 | 0.5 | [1 1] |
| 3 | 1 | 8 | 0.2636 | [1 1 3] |
| 4 | 1 | 16 | 0.2973 | [1 3 5 7] |
| 5 | 1 | 32 | 0.1677 | [1 5 7 9 11] |
| 2 | 2 | 16 | 0.1464 | [1 7] |
| 3 | 2 | 64 | 0.07647 | [1 11 27] |
| 4 | 2 | 256 | 0.04877 | [1 25 97 107] |
| 5 | 2 | 1024 | 0.03998 | [1 157 283 415 487] |

METHOD FOR WIRELESS DIFFERENTIAL COMMUNICATION USING MULTIPLE TRANSMITTER ANTENNAS

BACKGROUND OF THE INVENTION

1. Field of the Invention

The present invention relates to method for wireless communication; and more particularly, to differential wireless communication using multiple transmitter antennas.

2. Description of Related Art

Fading is one of several physical phenomena that tend to increase error rates, or to reduce channel capacity, in wireless transmission systems. Fading is the result of destructive interference, at the receiver, between correlated signal portions that because of scattering have arrived over different-length paths. Multiple antenna arrays can be used in wireless communication to reduce error rates and increase transmission rates.

In certain fading environments, the theoretical capacity of a multiple-antenna communication link increases linearly with the size of the transmitter or receiver array, this effect being determined by the array having the lesser number of antennas. This effect has been predicted for rich scattering environments in which fading is "flat." That is, the propagation coefficients that describe the effect of the physical transmission channel on the transmitted signal are approximately independent of frequency over the signal bandwidth. Flat fading can be achieved in practice for a particular environment if the bandwidth is not too great, or if it is restricted appropriately.

Significantly, such a linear increase in capacity occurs only if the propagation coefficients between all pairs of transmitter and receiver antennas are known to the receiver. In practice, this condition can be met only if the receiver is trained, from time to time, by receiving known training signals from the transmitter.

Communication methods that use such a training procedure are described, for example, in the co-pending U.S. patent application Ser. No. 08/938,168 now U.S. Pat. No. 6,058,105, commonly assigned herewith, filed Sep. 26, 1997 by B. M. Hochwald et al. under the title, "Multiple Antenna Communication System and Method Thereof."

Other co-pending patent applications, commonly assigned herewith, that describe related subject matter are Ser. No. 08/673,981 now U.S. Pat. No. 6,097,771, filed on Jul. 1, 1996 by G. J. Foschini under the title "Wireless Communications System Having a Layered Space-Time Architecture Employing Multi-Element Antennas," Ser. No. 09/060,657 now U.S. Pat. No. 6,317,466, filed on Apr. 15, 1998 by G. J. Foschini and G. D. Golden under the title "Wireless Communications System Having a Space-Time Architecture Employing Multi-Element Antennas at Both the Transmitter and Receiver," and a patent application filed on Jul. 10, 1998 by T. L. Marzetta under the title "Determining Channel Characteristics in a Space-Time Architecture Wireless Communication System Having Multi-Element Antennas."

Unfortunately, training intervals cut into the available time during which data may be transmitted. The length of this interval increases as the number of transmitter antennas is increased. Moreover, the propagation coefficients can be treated as constant only over an average period of time referred to as the fading coherence interval. To be effective, training should be repeated at least once per such interval.

However, fading is very rapid in some environments, such as those in which a mobile station is operating within a rapidly moving vehicle. For rapidly fading environments, the time between fades may be too short for the communication system to learn the propagation coefficients belonging to even one transmitting antenna, much less those of a multiple antenna array.

Thus, there remains a need to more fully realize, in practice, the theoretical benefits of multiple antenna arrays in fading environments.

In the co-pending U.S. patent application Ser. No. 09/134,297 now U.S. Pat. No. 6,327,310, commonly assigned herewith, filed on Aug. 14, 1998 by B. M. Hochwald et al. under the title, "Wireless Transmission Method for Antenna Arrays, Having Improved Resistance to Fading," there was described a new method of signal modulation. This new method, which we refer to as "Unitary Space-Time Modulation (USTM)," is robust against fading and receiver-induced noise in flat fading environments. Significantly, it does not require knowledge of the propagation coefficients, although in some implementations, such knowledge can be used to further improve performance.

In USTM, each message to be transmitted is transformed into a sequence of signals selected from a constellation of L possible signals, L a positive integer. (Thus, each transmitted signal embodies a number of bits given by log L. In the present discussion, "log" will denote the binary logarithm.) Each of these symbols is, itself, a time sequence of complex amplitudes for transmission by the transmitting antenna or antennas. The transmissions by all of the antennas in the transmitting array are concerted. All of these transmissions (for a given signal) are made in the same sequence of T successive time units (which we refer to as symbol intervals), T a positive integer.

Thus, a signal may be represented by a complex-valued matrix having T rows and M columns. Each column corresponds to a respective antenna of the transmitting array, and represents the sequence of complex amplitudes to be transmitted by the antenna. Each row corresponds to a particular one of the T symbol intervals, and describes the complex amplitude to be transmitted by each respective antenna during that interval. Such a set of complex amplitudes is referred to as a "symbol." Each symbol is distributed in space (i.e., across the transmitting array), and each signal is composed of T symbols distributed in time.

Significantly, each signal matrix must have the property that all of its columns are orthonormal. (It should be noted in this regard that corresponding to a signal matrix $\Phi$, the baseband signals provided to the transmitting array are represented by matrix S, where $S=\sqrt{TP}\ \Phi$. Here, P is the average power fed into each antenna.) Because each of these columns has length T, there can be never be more than T such columns that are all orthogonal to each other.

There are L signals, and M columns per signal. Thus, over the entire constellation, there are L×M columns. Because there will typically be many signals in the constellation (constellation sizes in the hundreds of thousands, or even more, are desirable in at least some applications), L×M will typically be much greater than T. Well known mathematical properties dictate that there can be no more than T mutually orthonormal column vectors. Therefore, it will be unlikely that, given a randomly chosen pair of signal matrices, the columns of one such matrix will be orthogonal to the columns of the other.

If such orthogonality between the respective columns of signal pairs were possible, the probability of confusing one received signal for another would be reduced to its ideal minimum value. Given that this ideal condition is unattainable, it is desirable, instead, to design the signal constellation in such way that correlations between pairs of signal matrices, of a kind that tends to increase the error probability, are made as small as possible.

U.S. patent application Ser. No. 09/134,297 now U.S. Pat. No. 6,327,310, cited above, describes techniques for minimizing these correlations that are most useful when the number M of transmitting antennas is relatively small. Commonly assigned U.S. patent application Ser. No. 09/206,843, filed on Dec. 7, 1998, by B. M. Hochwald et al. under the title, "Wireless Transmission Method for Antenna Arrays Using Unitary Space-Time Signals," describes a more powerful technique that can readily generate signal constellations of low correlation when M, L, and T are relatively large, without demanding impractical amounts of computational resources.

Another technique that tends to mitigate the effects of fading is differential phase modulation, in which phase differences carry transmitted information. Although differential phase modulation is a known technique for single-antenna transmission and reception in fading environments, there are no known generalizations of this technique for use with an arbitrary number of antennas.

SUMMARY OF THE INVENTION

The method of communication according to the present invention is a method of differential communication for a multiple transmitter array. In the method, a plurality of baseband signals are generated. Each baseband signal includes one or more sequences, in time, of complex numbers, each sequence to be transmitted from a respective antenna of the multiple transmitter antenna array. Each baseband signal is representable as a transmission matrix in which each column represents a respective antenna and each row represents a respective time segment. Each transmission matrix is generated based on input data and a previous transmission matrix representing a previously transmitted baseband signal.

The baseband signals are modulated on a carrier to form transmit carrier-level signals, and the transmit carrier-level signals are transmitted by the multiple transmitter antenna array.

Receive carrier-level signals are received by at least one antenna at the receiver end. Each of the receive carrier-level signals are formed from the transmit carrier-level signals passing through a channel. The receive carrier-level signals are demodulated to form a plurality of receive baseband signals. Each receive baseband signal includes one or more receive sequences, in time, of complex numbers. Each receive baseband signal is representable as a reception matrix in which each column represents a respective receiver antenna and each row represents a respective time segment. Each reception matrix depends on data encoded therein and a previous reception matrix representing a previously received receive baseband signal. The receive baseband signals are processed to obtain data represented thereby.

BRIEF DESCRIPTION OF THE DRAWINGS

The present invention will become more fully understood from the detailed description given hereinbelow and the accompanying drawings which are given by way of illustration only, wherein like reference numerals designate corresponding parts in the various drawings, and wherein.

DETAILED DESCRIPTION OF PREFERRED EMBODIMENTS

Differential modulation has long been used in single-antenna unknown-channel links when the channel has a phase response that is approximately constant from one time sample to the next. Differential modulation encodes the transmitted information into phase differences from symbol to symbol. The receiver decodes the information in the current symbol by comparing its phase to the phase of the previous symbol. Differential modulation is widely used because many continuously fading channels change little between successive time samples. In fact, many continuously fading channels are approximately constant for a time interval often much larger than two samples.

Differential modulation with a single antenna employs blocks of two time samples, since information is essentially transmitted by first providing a reference symbol and then a differentially phase-shifted symbol. Of course, after the starting symbol, each symbol acts as a reference for the next symbol, so signals essentially occupy two symbols but overlap by one symbol. The method according to the present invention applies such a scheme with M>1 transmitter antennas.

Figure 1:
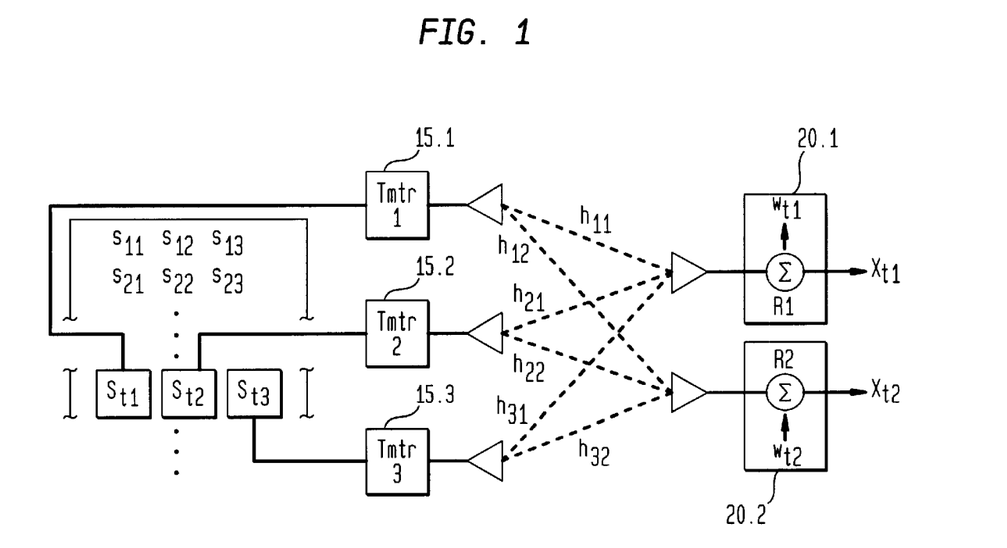
FIG. 1 illustrates a schematic block diagram of a communication system for transmitting and receiving signals according to the differential communication method of the present invention.

FIG. 1 is a schematic block diagram of a communication system for transmitting and receiving signals in accordance with the invention. As shown, a baseband signal 10 input to a transmitting array of antennas 15.1–15.3 is transmitted to a receiving array of antennas 20.1, 20.2. Thus, in the communication system shown, M=3 and N=2. (N is the number of antennas in the receiving array, which may be 1 or greater.) It should be noted that although one array is identified here as transmitting and the other as receiving, the principles of the invention will apply to bidirectional as well as to a unidirectional communication system. Furthermore, it should be understood that FIG. 1 is an example communication system, and that the present invention applies to a communication system with two or more transmitting antennas and any number of receiving antennas.

The physical transmission channel between the transmitting and receiving antennas is characterized by a set of M·N propagation coefficients $h_{ij}$, i=1, . . . , M, j=1, . . . , N, each a complex number characterizing the response at receiving antenna j due to transmissions from transmitting antenna i.

At each value t of discrete time, t=1, . . . , one of the rows of signals s in the signal matrix is input to the transmitting array. FIG. 1 shows the t'th such row being input, with each entry in the row input to a respective one of antennas 15.1–15.3. Each entry of the signal matrix represents a complex-valued baseband voltage level which, for transmission, is modulated onto the carrier frequency according to known methods.

At each receiving antenna 20.1, 20.2, the antenna response is amplified and demodulated to baseband according to known methods. Receiver noise, which is assumed to be statistically independent among the receivers and symbol periods, is represented in the figure as a component $w_{t1}$ added to the output of antenna 20.1 and a component $W_{t2}$ added to the output of antenna 20.2 at each time t. After demodulation to baseband, the output of the antenna array at time t is $x_{tn}$, where n=1 for antenna 20.1 and n=2 for antenna 20.2. Let H be the matrix whose entries are $h_{ij}$. If H can be treated as constant during the signal duration, then over that period, the response of the receiver array is given by $X=\sqrt{\rho/M}$ S H+W, where W represents the additive noise, S is a matrix whose t,m entry represents a signal transmitted at time t and on transmitter m, and $\rho$ is the signal-to-noise ratio. Furthermore, it will be assumed that $h_{ij}$ are independent CN(0,1) random variables (where CN(0,1) is the complex-normal zero-mean unit-variance distribution), but the present invention is not restricted to this assumption.

OPERATION—Transmission

As discussed above, in differential communication with one transmitter antenna, the data information is sent in the difference of the phases of two consecutive symbols. With multiple antennas, differential modulation is accomplished by overlapping 2M×M matrix signals $\Phi_l$ for l=0, ..., L−1, where L denotes the number of symbols needed to transmit data at a particular data rate. $\Phi_0, \ldots, \Phi_{L-1}$ must have the following structure to permit overlapping:

$$\Phi_l = \frac{1}{\sqrt{2}} \begin{bmatrix} V_{l1} \\ V_{l2} \end{bmatrix}, l = 0, \ldots, L-1, \quad (1)$$

where $V_{l1}$ and $V_{l2}$ are, for the moment, arbitrary M×M complex matrices. Furthermore, by establishing $\Phi l$ so that $\Phi_l^\dagger \Phi l = I_M$, it follows that $$V_{l1}^\dagger V_{l1} + V_{l2}^\dagger V_{l2} = 2I_M. \quad (2)$$

where † denotes the complex conjugate transpose of a vector or matrix.

$\Phi l$ and $\Phi l Y l, (l=0, \ldots, L-1)$ are indistinguishable for arbitrary unitary M×M matrices Yl. Therefore freedom exists to "preprocess" each signal $\Phi l$ to be sent by right-multiplying by a unitary matrix so that its first M×M matrix block equals the second matrix block of the previously (also possibly preprocessed) sent symbol, say $\Phi l$. After $\Phi l$ is preprocessed, because its first block equals the second block of the signal already sent, only its (normalized) second block needs to be sent. For this overlapping to succeed, it is required that a unitary transformation exist between the first block of $\Phi l$ and the second block of $\Phi l'$; i.e., for any l and l', the equation $$V_{l'2} Y_{l'l} = V_{l1}, \quad (3)$$

should have a solution for some unitary Yl'l.

The most general and preferred set of $V_{l1}$ and $V_{l2}$ matrices that satisfy (3) is, in general, obtained by choosing $V_{l1}$ and $V_{l2}$ to be unitary. If $V_{l1}$ and $V_{l2}$ are unitary for all l then (2) holds, and (3) has the unitary solution $Y_{l'l} = V_{l'2}^\dagger V_{l1}$. With this choice, because $\Phi l$ and $\Phi_l V_{l1}^\dagger$ are indistinguishable at the receiver, the canonical representation in (4) below results $$\Phi_l = \frac{1}{\sqrt{2}} \begin{bmatrix} I_M \\ V_l \end{bmatrix}, \quad (4)$$

where $V_l = V_{l2} V_{l1}^\dagger$ is unitary. Without loss of generality, it is assumed that the signals $\Phi l$ are of the form (4) where Vl is a unitary matrix and is proportional to a matrix with orthonormal columns.

In equation (4), the signals $\Phi_1, \ldots, \Phi_L$, are 2M×M matrices whose first halves are $I_M$, and whose second halves are used to form the transmission matrix in our M-antenna differential modulation scheme. A transmission data rate of R bits per channel use requires a constellation with $L=2^{RM}$ signals; thus L distinct Vl data matrices are needed. Each of the Vl data matrices (and L signals) represents a different integer l.

Figure 2:
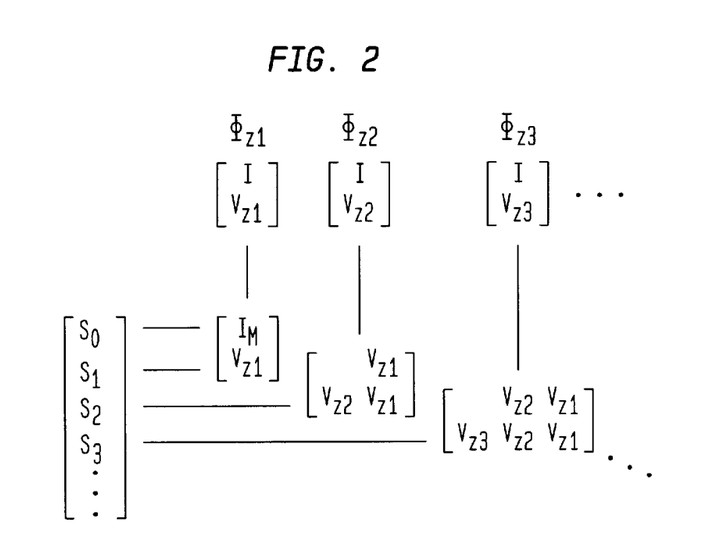
FIG. 2 illustrates a schematic representation of M-antenna differential modulation according to the present invention.

FIG. 2 schematically displays multiple-antenna differential modulation. Here each of the M columns of each transmission matrix $S_\tau$ (which are M×M matrices) represents a sequence of complex numbers transmitted on a respective one of the M antennas as functions of time for M symbols. The sequence or sequences of complex numbers form a baseband signal which is modulated on a carrier and transmitted by the multiple transmitter antenna array.

The first transmission is a scaled version of $\Phi_{z1}$; that is, an identity matrix $S_0 = \sqrt{M} I_M$ is sent, followed by $S_1 = \sqrt{M} V_{z1}$. The scaling factor $\sqrt{M}$ normalizes the transmitted signal power, $z_{96}$ represents the τth integer data for transmission and τ represents the order of transmission. Accordingly, the first and second data sequences $z_1$ and $z_2$ transmitted could be the same integer.

Next, we wish to send $\Phi_{z2l}$. To make the identity block of $\Phi_{z2}$ overlap with the last sent block $V_{z1}$ we postmultiply $\Phi_{z2}$ by $\Phi_{z1}$. The second block of $\Phi_{z2}$ then becomes $V_{z2} V_{z1}$ and, hence, $S_2 = \sqrt{M} V_{z2} V_{z1} = V_{z2} S_1$. In general, the differential transmission scheme sends the transmission matrices $$S_\tau = V_{z\tau} S_{\tau-1} \quad \tau=1, 2, \ldots \quad (5)$$

This is a fundamental transmission equation. Clearly, all transmitted matrices $S_\tau$ will be $\sqrt{M}$ times a unitary matrix, and are proportional to a matrix having orthonormal columns.

Accordingly, when a data integer l is to be sent, the corresponding data matrix Vl is selected, and transmission matrix $S_\tau$ is generated using equation (5).

OPERATION—Reception

Next, reception of the above transmitted signals will be described. A demodulator in a receiver receives receive carrier-level signals, each of which is formed from the transmit carrier-level signals transmitted from a multiple transmitter antenna array passing through a channel, using at least one receiver antenna. The demodulator demodulates the receive carrier-level signals to form a plurality of receive baseband signals, each receive baseband signal includes one or more receive sequences, in time, of complex numbers. Each receive sequence is a linear combination of the transmit sequences. Each receive baseband signal is representable as a reception matrix $X_\tau$, where $X_\tau$ is an M×N matrix, in which each column represents a respective receiver antenna and each row represents a respective time segment.

As discussed in detail below, each reception matrix depends on data encoded therein and a previous reception matrix representing a previously received receive baseband signal.

With N receiver antennas, the stream of reception matrices is:

$$\begin{bmatrix} X_0 \\ X_1 \\ X_2 \\ \vdots \end{bmatrix}, \quad (6)$$

Demodulation requires looking at two successive matrices to form a matrix with 2M rows.

$$X = \begin{bmatrix} X_{\tau-1} \\ X_\tau \end{bmatrix}. \quad (7)$$

Assume that the fading coefficients are constant across the 2M time samples represented in the rows of X. Then the relationship with the sent stream is $$X_{\tau-1} = \sqrt{\rho/M} S_{\tau-1} H + W_{\tau-1} \quad (8)$$

$$X_\tau = \sqrt{\rho/M} S_\tau H + W_\tau, \quad (9)$$

where $W_\tau$ is a M×N matrix of additive independent CN(0,1) noise (where CN(0,1) is the complex-normal zero-mean unit-variance distribution) and $\rho$ is the signal-to-noise ratio. The maximum likelihood demodulator is $$(\hat{z}_\tau)_{ml} = \arg\max_{l=0,\ldots,L-1} \|\Phi_l^\dagger X\| = \arg\max_{l=0,\ldots,L-1} \|X_{\tau-1} + V_l^\dagger X_\tau\|, \quad (10)$$

where $\|A\|^2$ is the Frobenius norm of matrix A given by the equation $$\|A\|^2 = tr(A^\dagger A) = tr(AA^\dagger) = \sum_{t=1}^{T} \sum_{m=1}^{M} |a_{tm}|^2 = \sum_{m=1}^{\min(M,T)} \sigma_m(A)^2. \quad (11)$$

where $\sigma_m(A)$ is the mth singular value of matrix A.

Substituting the fundamental differential transmitter equation $S_\tau = V_{z\tau} S_{\tau-1}$ into (9) and applying (8) yields:

$$X_\tau = V_{z\tau} X_{\tau-1} + W_\tau - V_{z\tau} W_{\tau-1}. \quad (12)$$

Because the noise matrices are independent and statistically invariant to multiplication by unitary matrices, equation (12) can be written as:

$$X_\tau = V_{z\tau} X_{\tau-1} + \sqrt{2} W'_\tau, \quad (13)$$

where $W'_\tau$ is a M×N matrix of additive independent CN(0,1) noise. This is the fundamental differential receiver equation.

As demonstrated by equation (13), each reception matrix depends on a data matrix representing the data encoded therein pre-multiplied by the previous reception matrix. Equation (13) further states that each data matrix is correlated with a previous reception matrix and a current reception matrix, and that the data sequence corresponding to the data matrix having a highest correlation result is output as the data.

Remarkably, the matrix of fading coefficients H does not appear in the fundamental differential receiver equation (13). In fact, formally, this equation shows that the signal $V_{z\tau}$ appears to be transmitted through a channel with fading response $X_{\tau-1}$, which is known to the receiver, and corrupted by noise with twice the variance. This corresponds to the well known result that standard single-antenna differential modulation suffers from approximately a 3 dB performance loss in effective SNR when the channel is unknown versus when it is known.

OPERATION—Establishing Constellations

Next, the generation of constellations for differential communication according to the present invention will be described. Equation (13) demonstrates that our multiple-antenna differential setting appears to turn the original unknown-channel communication problem into a known channel problem. First the connection between known and unknown channels will be described.

Known Channel

Consider signals that are M×M matrices. The action of the channel is $$X_\tau = \sqrt{\rho/M} S_\tau H + W_\tau, \quad (14)$$

where H is known to the receiver. In the known channel, assume that the constellation consists of $L=2^{RM}$ signals $\Psi_l$ that are unitary. The transmission matrix is then $$S_\tau = \sqrt{M} \Psi_{z\tau}. \quad (15)$$

Because H is known at the receiver, the maximum likelihood demodulator is $$(\hat{z}_\tau)_{ml} = \arg\min_{l=1,\ldots,L} \|X_\tau - \sqrt{\rho}\, \Psi_l H\|. \quad (16)$$

and has pairwise probability of error Chernoff upper bound given by $$P_e \le \frac{1}{2} \prod_{m=1}^{M} \left[1 + \frac{\rho T}{4M} \sigma_m^2 (\Psi_{l'} - \Psi_l)\right]^{-N} \quad (17)$$

where T is a number of time samples.

Hence, good constellations $\Psi_1, \ldots, \Psi_L$ have singular values $$\sigma_m(\Psi_{l'} - \Psi_l), m=1,\ldots,M \quad (18)$$

that are as large as possible for $l' \ne l$. For large SNR, the probability of error depends dominantly on the product $$\prod_{m=1}^{M} \sigma_m(\Psi_l - \Psi_{l'}) = |det(\Psi_l - \Psi_{l'})|. \quad (19)$$

In particular, a larger product equates to a smaller error probability.

Connection Between Signal Designs

The Chernoff upper bound on mistaking signals $S_l$ and $S_{l'}$ when the channel is unknown is $$P_e \le \frac{1}{2} \prod_{m=1}^{M} \left[1 + \frac{(\rho T/M)^2 (1 - d_{ll'm}^2)}{4(1 + \rho T/M)}\right]^{-N} \quad (20a)$$

where $d_{ll'1}$ to $d_{ll'M}$ are singular values of the M×M matrices obeying $\Phi_l^\dagger \Phi_l = I$ and a good constellation $\Phi_1, \ldots, \Phi_L$ has singular values $$d_{ll'm} = \sigma_m(\Phi_{l'}^\dagger \Phi_l), m=1,\ldots,M \quad (20b)$$

that are as small as possible for $l' \ne l$. Based on the differential unitary space-time signal constructions, we build $\Phi l$ as $$\Phi_\ell = \frac{1}{\sqrt{2}} \begin{bmatrix} I_M \\ \Psi_\ell \end{bmatrix}, \quad (21)$$

where $\Psi l$ are unitary matrices taken from a constellation of known-channel signals. Then, $$\Phi_{\ell'}^\dagger \Phi_\ell = (I_M + \Psi_{\ell'}^\dagger \Psi_\ell)/2, \quad (22)$$

which implies that $$\sigma_m^2(\Phi_{\ell'}^\dagger \Phi_\ell) = \frac{1}{4}\sigma_m^2(I_M + \Psi_{\ell'}^\dagger \Psi_\ell) = \frac{1}{4}\lambda_m(2I_M + \Psi_{\ell'}^\dagger \Psi_\ell + \Psi_\ell^\dagger \Psi_{\ell'}), \quad (23)$$

and $$1 - \sigma_m^2(\Phi_{\ell'}^\dagger \Phi_\ell) = \quad (24)$$
$$\frac{1}{4}\lambda_m(2I_M - \Psi_{\ell'}^\dagger \Psi_\ell - \Psi_\ell^\dagger \Psi_{\ell'}) = \frac{1}{4}\sigma_m^2(I_M - \Psi_{\ell'}^\dagger \Psi_\ell) = \frac{1}{4}\sigma_m^2(\Psi_{\ell'} - \Psi_\ell)$$

where $\lambda_m$ represents the mth eigenvector of matrix A. Equation (24) says that minimizing the singular values of the correlations of the unknown-channel signals is equivalent to maximizing the singular values of the differences of the known-channel signals. We now define a quantity $\zeta_{ll'}$ which can be compared for different constellations.

$$\zeta_{\ell\ell'} = \prod_{m=1}^M \left(1 - \sigma_m^2(\Phi_{\ell'}^\dagger \Phi_\ell)\right)^{1/M} = \quad (25)$$
$$\frac{1}{4}\prod_{m=1}^M \sigma(\Psi_{\ell'} - \Psi_\ell)^{2/M} = \frac{1}{4}|det(\Psi_{\ell'} - \Psi_\ell)|^{2/M}.$$

A large $\zeta_{ll'}$ equates to small pairwise error probability (see equation 20a) when $\rho$ is large and the channel is unknown. On the other hand, equation (19) states that large $|det(\Psi_{l'} - \Psi_l)|$ also equates to small pairwise error probability when the channel is known. Thus a constellation of good known-channel transmission matrices can be augmented with an identity matrix block to form a constellation of good unknown-channel matrix signals. Conversely, a constellation of good unknown-channel signals of the form (4) has $V_l$ matrices that form a constellation of good known-channel signals. Intuitively, the identity block can be viewed as training from which the channel is learned before the second block carrying data is sent. Differential modulation, of course, lets the training and data blocks overlap.

Connection Between Demodulation Strategies

As discussed above, the fundamental differential receiver equation (13) is $$X_\tau = V_{z\tau} X_{\tau-1} + \sqrt{2} W'_\tau. \quad (13)$$

As remarked above, $X_{96\ -1}$ can be viewed as a known channel through which the data matrix $V_{z\tau}$ is sent. Demodulating $z_\tau$ using (16) results in the following:

$$\hat{z}_\tau = arg \min_{\ell=0,\ldots,L-1} \|X_\tau - \Psi_\ell X_{\tau-1}\| \quad (26)$$
$$= arg \min_{\ell=0,\ldots,L-1} tr(X_\tau^\dagger X_\tau + X_{\tau-1}^\dagger X_{\tau-1} - X_{\tau-1}^\dagger \Psi_\ell^\dagger X_\tau - X_\tau^\dagger \Psi_\ell X_{\tau-1})$$

-continued
$$= arg \max_{\ell=0,\ldots,L-1} tr(X_{\tau-1}^\dagger \Psi_\ell^\dagger X_\tau + X_\tau^\dagger \Psi_\ell X_{\tau-1})$$

This estimate is exactly the maximum likelihood demodulator for the unknown channel (10):

$$(\hat{z}_\tau)_{ml} = arg \max_{\ell=0,\ldots,L-1} \|X_{\tau-1} + \Psi_\ell^\dagger X_\tau\| \quad (27)$$
$$= arg \max_{\ell=0,\ldots,L-1} tr(X_{\tau-1}^\dagger \Psi_\ell^\dagger X_\tau + X_\tau^\dagger \Psi_\ell X_{\tau-1}).$$

These connections imply that the differential scheme can use existing constellations and demodulation methods from the known channel.

Group Constellations

Next, structuring the set of L data matrices as a group or part of a group will be described. Let the set of data matrices V be the set of L distinct unitary matrices $V = \{V_0, \ldots, V_{L-1}\}$ that forms a group. This assumption simplifies the transmission scheme and the constellation design.

Group Conditions

An internal composition rule is imposed on V. For any $l, l' \in \{0, \ldots, L-1\}$, it is required that $$V_l V_{l'} = V_{l''} \quad (28)$$

for some $l'' \in \{0, \ldots, L-1\}$. An equivalent (isomorphic) additive operation on the indices is defined as $$l'' = l \oplus l'. \quad (29)$$

Associativity:

Follows immediately from the associativity of matrix multiplication.

By choosing the unitary matrix to have the block form $$\begin{bmatrix} I_M & 0_M \\ 0_M & V_0^\dagger \end{bmatrix} \quad (30)$$

it can be assumed, without loss of generality, that $V_0 = I_M \in V$.

One advantage of a group constellation is that the transmitter never has to explicitly multiply matrices, but only needs to compute (31) using a lookup table. Another advantage is simplified design. Good constellations are often found by searching over large candidate sets. Computing $\zeta$ (see equation (25)) for a candidate constellation requires checking $(L-1)L/2$ correlations of the form $$\Phi_{l'}^\dagger \Phi_l = \frac{1}{2}(I_M + V_{l'}^\dagger V_l). \quad (34)$$

Figure 3:
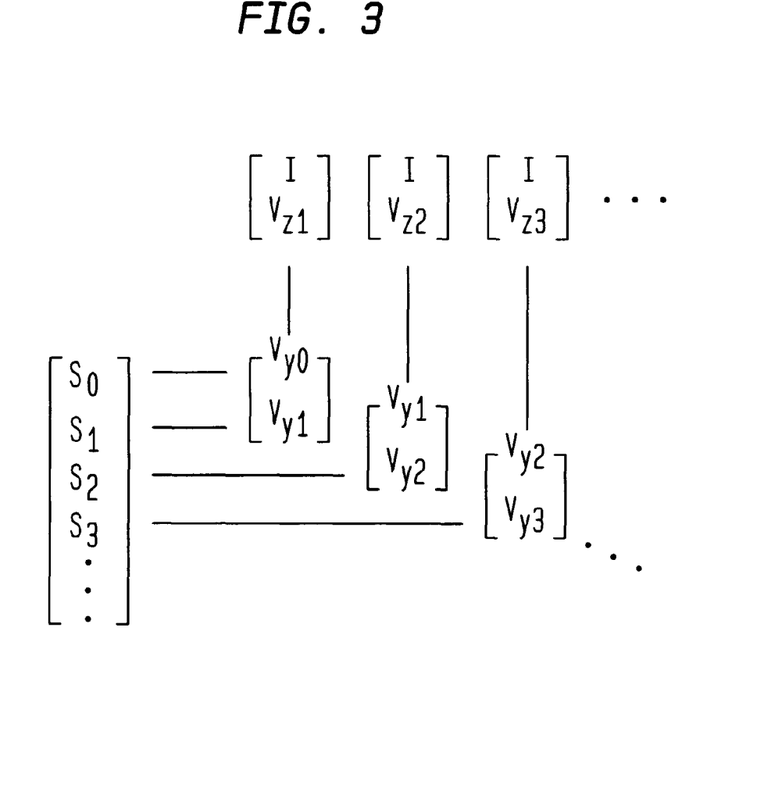
FIG. 3 illustrates a schematic representation of M-antenna differential modulation according to the present invention when the constellation forms a group.

However, when V is a group it suffices to check only $L-1$ correlations; in particular, one may check the singular values of $\Phi_0^\dagger \Phi_l = (\frac{1}{2})I_M + V_l$. FIG. 3 illustrates a schematic representation of M-antenna differential modulation according to the present invention when the constellation forms a group.

Commutative Group Constellations

The design of constellations can be further simplified by imposing the requirement that the product of any two data matrices of V commutes; namely, that the group V is commutative. Imposing commutativity has some appealing consequences. Since $V_0, \ldots, V_{L-1}$ are unitary, they are normal matrices, and can be written as $V_l = P_l \Lambda_l P_l^\dagger$, where the matrix of eigenvectors $P_l$ obeys $P_l^\dagger P_l = P_l P_l^\dagger = I$, and $\Lambda_l$ is a matrix of eigenvalues of $V_l$. But because $V_0, \ldots, V_{L-1}$ commute, they share a common set of eigenvectors, $P = P_0 =$ $P_1 = \ldots = P_{L-1}$. Consequently, this constellation of matrices can be diagonalized into a new constellation comprising diagonal matrices of eigenvalues using one fixed l-independent similarity transform $V_l \to P^{-1}V_lP$. The similarity transform does not effect the error performance of the constellation because it is equivalent to postmultiplying every signal $\Phi_l$ by the unitary M×M matrix P and premultiplying $\Phi_l$ by the unitary 2M×2M matrix Inverse Element:

Because V comprises unitary matrices, the matrix products $V_1V_0, V_1V_1, \ldots, V_1V_{L-1}$ are all distinct. Since these products are all in V, they must simply be a permutation of the elements of V. In particular, there exists a solution to $V_1V_l = V_0 = I$, for some $V_l$. Thus, every matrix in $V_l \in V$ has an inverse $V_l^\dagger \in V$, and V is therefore a group. Since V is a finite group of size L, its elements must all be Lth roots of unity: $V_l^L = I_M$ for $l = 0, \ldots, L-1$.

Of the four requirements that a group must satisfy, only the requirement of internal composition resulted in a loss of generality. The remaining requirements are naturally satisfied. Consequently, to simplify generating a set of data matrices (i.e., a constellation) it is assumed that the set of data matrices are unitary matrices and form a group or part of a group.

Advantages of Group Constellations

Differential modulation can now be written more succinctly by letting $$y_\tau = z_\tau \Theta y_{\tau-1}, \tau = 1, 2, \ldots, y_0 \tag{31}$$

so that $$V_{y\tau} = V_{z\tau}V_{y\tau-1}. \tag{32}$$

The transmission matrix becomes $$S_\tau = \sqrt{M}V_{y\tau} = V_{z\tau}S_{\tau-1} \; \tau = 1, 2, \ldots \tag{33}$$

Thus, unlike the general case, when V is a group each transmission matrix is a scaled element of V.

$$\begin{bmatrix} P^{-1} & 0_M \\ 0_M & P^{-1} \end{bmatrix}. \tag{35}$$

Thus, assuming V is commutative is equivalent to assuming that all of its elements are diagonal matrices. If all the $V_l$ are diagonal, then the signals $\Phi_l$ consist of two diagonal blocks (the first of which is identity). This implies that at any given time only one antenna is active. We call these signals diagonal.

Cyclic Construction

A simple way to build the commutative group V with L elements is to make it cyclic. Then $V_l$ is of the form $$V_l = V_1^l, \; l = 0, \ldots, L-1 \tag{36}$$

where the generator matrix $V_1$ is an Lth root of the unity. Addition on the indices $$l'' = l \oplus l' \tag{37}$$

then becomes $$l'' = l + l' (\bmod L). \tag{38}$$

Hence, the transmitter does not even need a lookup table to compute the differential transmission scheme. The matrix $V_1$ is diagonal and can be written as $$V_1 = \begin{bmatrix} e^{i\frac{2\Pi}{L}u_1} & 0 & \cdots \\ 0 & \ddots & 0 \\ 0 & \cdots & e^{i\frac{2\Pi}{L}u_M} \end{bmatrix}, u_m \in \{0, \ldots, L-1\}, m = 1, \ldots, M. \tag{39}$$

With this cyclic construction, the 2M×M signals $\Phi_l$ conform to a systematic design and are given by $$\Phi_l = \Theta^l \Phi_0, \tag{40}$$

where $$\Theta = \begin{bmatrix} I_M & 0_M \\ 0_M & V_1 \end{bmatrix}, \text{ and } \Phi_0 = \frac{1}{\sqrt{2}} \begin{bmatrix} I_M \\ I_M \end{bmatrix}. \tag{41}$$

The lth signal in the constellation therefore has the form $$\Phi_\ell = \frac{1}{\sqrt{2}} \begin{bmatrix} 1 & 0 & \cdots \\ 0 & \ddots & 0 \\ 0 & \cdots & 1 \\ e^{i\frac{2\Pi}{L}u_1\ell} & 0 & \cdots \\ 0 & \ddots & 0 \\ 0 & \cdots & e^{i\frac{2\Pi}{L}u_M\ell} \end{bmatrix}, \ell = 0, \ldots, L-1. \tag{42}$$

These signals have a very simple interpretation. At any time, only one transmitter antenna is active and transmitting either a reference symbol (which in differential modulation is actually the previously sent symbol) or a phase shifted symbol. Thus, within the τth block, antenna m transmits at time t=τM+m a symbol that is differentially phase shifted by $(2\pi/L)u_m l$ relative to its previous transmission. The value of l is determined by the data. It is important to note that the phase shifts are potentially different for each antenna.

Signal matrices $V_l$ with low pairwise probability of demodulation error form correlations (34) with singular values that are small for all $l' \neq l$. The singular values of $(\frac{1}{2})(I_M + V_1^l)$ are $$d_{0lm} = (\frac{1}{2})|1 + e^{i\pi u_m l/L}| = \sqrt{1/2 + (1/2)\cos(2\pi u_m l/L)} = |\cos(\pi u_m l/L)|. \tag{43}$$

Thus, $$\varsigma_{0\ell} = \left[\prod_{m=1}^{M} \sin^2(\pi u_m \ell/L)\right]^{1/M}. \tag{44}$$

The maximin design requirement is to find $u_1, \ldots, U_M$ satisfying.

$$\{u_1, \ldots, u_M\} = \underset{0 \leq u_1, \ldots, u_M \leq L-1}{\arg \max} \underset{\ell=1, \ldots, L-1}{\min} \left[\prod_{m=1}^{M} \sin^2(\pi u_m \ell/L)\right]^{1/M}. \tag{45}$$

Multi-cyclic construction

In general, if L is not prime, a finite commutative group of size L may be written as a cross product of cyclic groups. A corresponding signal construction that is multi-index and systematic may be defined. For example, choose a factorization of L as $$L = \prod_{k=1}^{K} L_k \qquad (46)$$

and use a multi-index $l=(l_1, l_2, \ldots, l_k)$ where $l_k \in \{1, \ldots, L_k\}$. Addition on the multi-indices $$l''=l \oplus l' \qquad (47)$$

is defined as $$l''_k = l_k + l'_k \pmod{L_k}, k=1, \ldots, k. \qquad (48)$$

The data matrices are given by $$V_\ell = \prod_{k=1}^{K} \Lambda_k^{\ell_k}, \qquad (49)$$

where $\Lambda_k$ is a diagonal matrix obeying $\Lambda_k^{L_k}=I_M$, with diagonal elements $\lambda_{km}=\exp(2\pi i u_{mk}/L_k)$. The diagonal elements of $V_l$ are thus $$v_{\ell m} = \exp\left(2\pi i \sum_{k=1}^{K} u_{mk}\ell_k/L\right), m = 1, \ldots, M. \qquad (50)$$

and the singular values of the correlation matrices are $$d_{\ell m} = (1/2)|1 + v_{\ell m}| = \left|\cos\left(\pi \sum_{k=1}^{K} u_{mk}\ell_k/L\right)\right|. \qquad (51)$$

A special case of the multi-cyclic construction happens when $L=Q^K$. Then our constellation is a subset of a product Q-ary PSK and all arithmetic is modulo-Q. When K=M and thus $Q=2^R$, our constellation is simply a product Q-ary PSK; each antenna effectively uses Q-ary DPSK independently.

Next, the performance of constellations of diagonal signals designed for M=1, ..., 5 transmitter antennas will be described. In the search for good constellations, some simplifying rules were employed that caused no loss of generality, regardless of the performance criterion used:

1) Because every antenna is statistically equivalent to every other, the ordering $u_1 \geq u_2 \geq \ldots \geq u_M$ may be imposed.
2) $u_m > 0$ may be assumed, because if $u_m=0$, then the mth antenna can only transmit the symbol 1 and is effectively rendered inoperative.
3) The constellation generated by $u_1, \ldots, u_M$ and $\alpha u_1, \ldots, \ldots, \alpha u_M$ are identical for all $\alpha$ relatively prime to L. From equation (40), it is seen that multiplication by $\alpha$ simply reorders the signals in increasing $\alpha l \pmod{L}$ instead of increasing l.

Constellations of differential unitary space-time signals can be designed with a maximin procedure: find the $u_1, \ldots, u_M \in \{0, \ldots, L-1\}$ that maximize $$\varsigma = \min_{\ell \in \{1, \ldots, L-1\}} \left[\prod_{m=1}^{M} \sin^2(\pi u_m \ell/L)\right]^{1/M} \qquad (52)$$

Explicit solutions to this procedure are not known, and an exhaustive computer search was conducted considering only single-index cyclic constructions K=1. Candidates for the best set of $u_1, \ldots, u_M \in \{0, \ldots, L-1\}$ are generated exhaustively, tested for performance by computing $\varsigma$, and kept if they exceed the previously best candidate.

The search space can be reduced using the following rules:

a) Equation (52) does not change if $u_m$ is replaced by $L-u_m$, and the search, therefore, may be restricted to $u_m \in \{0, \ldots, L/2\}$ (assuming L is even).
b) If $u_m$ shares a factor with L then there is an $l \in \{0, \ldots, L-1\}$ for which $u_m l=0 \pmod L$; this implies that $\varsigma=0$. Thus, the search can be restricted to $u_m$ that are relatively prime to L.
c) By Rule b), it can be assumed that ul is relatively prime to L. But then there exists an $\alpha$ such that $\alpha u_1=1 \pmod L$. By multiplying $u_2, \ldots, u_M$ by this same $\alpha$, and using Rule 3) above, it may be assumed that $u_1=1$.
d) In equation (52), the product for l and L-l is the same; it is 1 for l=L/2 (assuming L is even). Thus, the minimum may be taken over $l \in \{1, \ldots, L/2-1\}$.

Figure 4:
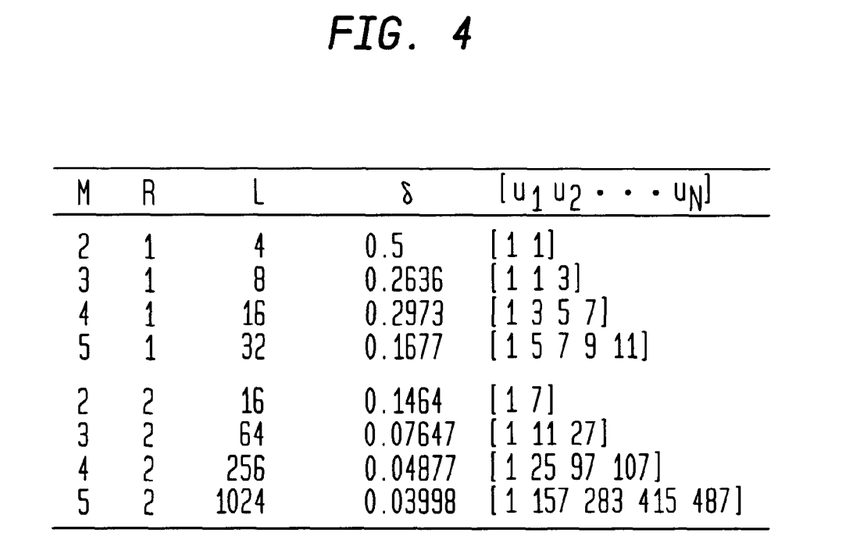
FIG. 4 illustrates a table showing the results of searches for constellations for 2, 3, 4, and transmitter antenna arrays.

The table in FIG. 4 shows the results of our searches for constellations of $L=2^{RM}$ that maximize $\varsigma$. Because L is a power of two, only odd $u_m$ appear. Also included is an upper bound on the block error rate obtained by summing $l \neq l'$ the Chernoff bounds with $\rho=20$ dB.

Constellations with more than $2^{RM}$ signals, from which we would employ a subset, were not searched; however, better performing constellations could sometimes be generated in this way.

The performance of the constellations listed in the table of FIG. 4 was examined by sending the signals over a simulated continuously fading Rayleigh channel. The fading is assumed to be independent between antennas but correlated in time according to Jakes' model. A typical physical scenario where such a model is appropriate is a base station antenna array communicating with a mobile. If we assume that the mobile is traveling at approximately 25 m/s (55 mph) and operating at 900 MHz, the Doppler shift is approximately $f_D=75$ Hz. The Jakes correlation between two fading coefficients t time samples apart is $J_0(2\pi f_D T_s t)$, where $T_s$ is the sampling period and $J_0$ is the zero order Bessel function of the first kind. It was also assumed that $T_s=1/30,000$ so $T_s f_D=0.0025$. The Jakes correlation function has its first zero at $t \approx 153$.

Supposing that binary data are to be transmitted, bits have to be assigned to the constellation signals. It was observed that if, $L=2^{RM}$ is even, then $u_1, \ldots, u_M$ are all odd (see Rule 3), $V_1^{L/2}=-I_M$ and $\Phi_l^\dagger \Phi_{l+L/2}=0$. Hence, signals offset by L/2 are maximally separated and are given complementary bit assignments.

Figure 5:
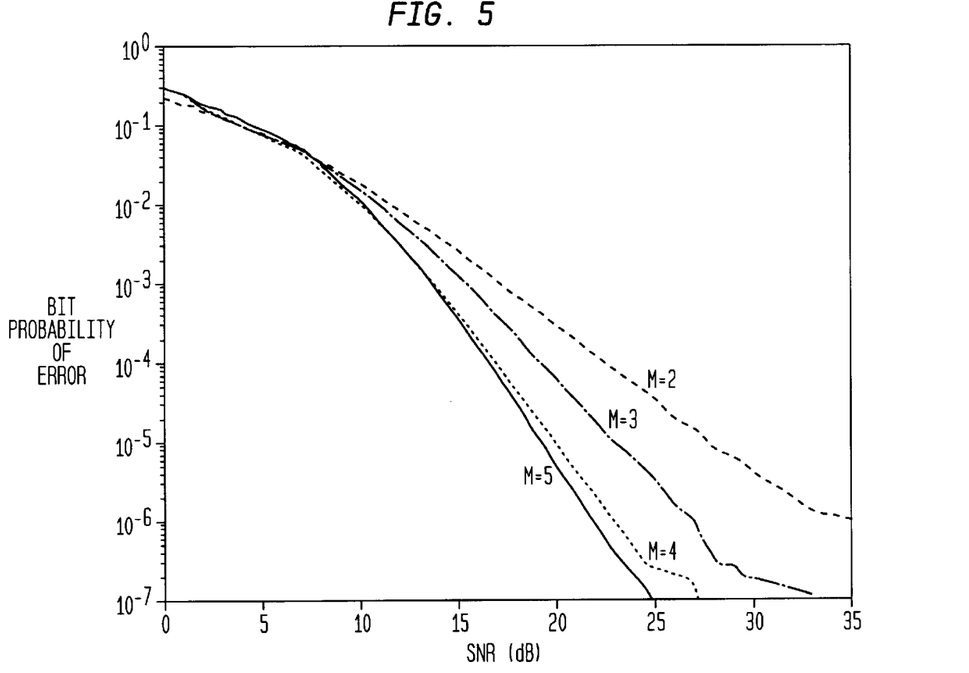
FIG. 5 illustrates the performance in terms of bit probability of error versus signal-to-noise ratio for the constellations of FIG. 4 when received by a single antenna, and wherein the data rate is 1.
Figure 6:
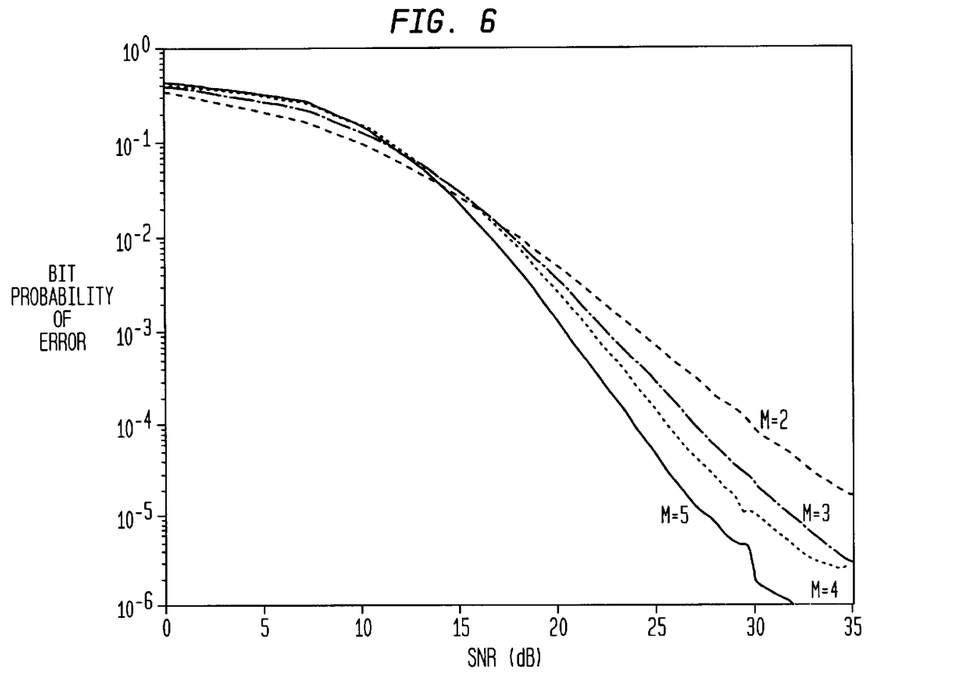
FIG. 6 illustrates the performance in terms of bit probability of error versus signal-to-noise ratio for the constellations of FIG. 4 when received by a single antenna, and wherein the data rate is 2.

FIGS. 5 and 6 show the bit error performance of M=2,3,4, and 5 transmitter antennas and one receiver antenna for R=1 and R=2, respectively. It is seen that the differential unitary space-time signals are especially effective at high SNR.

An advantage of our diagonal signals is their simplicity. Because only one antenna transmits at any given time, one power amplifier can be switched among the antennas. But this amplifier must deliver M-times the power it would otherwise deliver if there were an array of M amplifiers simultaneously driving the other antennas. Consequently, this amplifier needs to have a larger linear operating range than an amplifier array would. Amplifiers with a large linear range are often expensive to design and build. It may therefore occasionally be desirable to have all M antennas transmitting simultaneously at lower power. In this case, the constellation is modified by post-multiplying the transmission matrices by M×M unitary matrices such as discrete Fourier transform matrices. This has the effect of smearing the transmitted symbol on any active antenna across all of the antennas. On the other hand, the entire constellation may be premultiplied by a common unitary matrix, smearing the symbols in time. Neither constellation modification affects its error performance in any way.

The invention being thus described, it will be obvious that the same may be varied in many ways. Such variations are not to be regarded as a departure from the spirit and scope of the invention, and all such modifications are intended to be included within the scope of the following claims.

What is claimed:

1. A method of wireless differential communication for a multiple transmitter antenna array, comprising:

generating a plurality of baseband signals, each baseband signal including one or more sequences, in time, of complex numbers, each sequence to be transmitted from a respective antenna of said multiple transmitter antenna array, each baseband signal being representable as a transmission matrix in which each column corresponds to one of said sequences and represents a respective antenna and in which each row represents a respective time segment, each transmission matrix generated based on a previous transmission matrix representing a previously transmitted baseband signal and at least one provided data sequence of a predetermined lengh;

modulating said baseband signals on a carrier to form carrier-level signals; and transmitting said carrier-level signals from said multiple transmitter antenna array.

2. The method of claim 1, wherein each transmission matrix is proportional to a matrix having orthonormal columns.

3. The method of claim 1, further comprising:

providing a set of data matrices, each data matrix corresponding to a different data sequence of a predetermined length such that said set of data matrices representing data sequences of said predetermined length; and wherein said generating step generates each transmission matrix from a selected one of said data matrices and said previous transmission matrix.

4. The method of claim 3, wherein said generating step comprises:

receiving said input data of said predetermined length;

selecting a data matrix corresponding to said received input data; and pre-multiplying said previous transmission matrix by said selected data matrix to obtain a new transmission matrix.

5. The method of claim 4, wherein each data matrix is proportional to a matrix having orthonormal columns.

6. The method of claim 5, wherein said set of data matrices forms at least part of a group such that multiplying any two data matrices from said set of data matrices results in a matrix from said group.

7. The method of claim 6, wherein said set of data matrices are derived from a generator matrix.

8. The method of claim 7, wherein each of said data matrices is a power of said generator matrix.

9. The method of claim 8, wherein said generator matrix is a diagonal matrix.

10. The method of claim 5, wherein said set of data matrices is a set from a plurality of sets providing a highest transmission quality out of said plurality of sets.

11. A method of wireless differential communication, comprising:

receiving receive carrier-level signals, each of which is formed from transmit carrier-level signals transmitted from a multiple transmitter antenna array passing through a channel, using at least one receiver antenna, said transmit carrier level signals formed from a plurality of transmit baseband signals;

demodulating said receive carrier-level signal sequence to form a plurality of receive baseband signals, each receive baseband signal including one or more receive sequences, in time, of complex numbers, each receive baseband signal being representable as a reception matrix in which each column corresponds to one of said receive sequences and represents a respective receiver antenna and in which each row represents a respective time segment, each reception matrix depending on data encoded therein and a previous reception matrix representing a previously received receive baseband signal; and processing said receive baseband signals to obtain data represented thereby.

12. The method of claim 11, wherein said transmit carrier-level signals were formed from a plurality of transmit baseband signals, each transmit baseband signal including one or more transmit sequences, in time, of complex numbers, each transmit sequence having been transmitted from a respective antenna of said multiple transmitter antenna array, each transmit baseband signal being representable as a transmission matrix in which each column corresponds to one of said transmit sequences and represents a respective transmitter antenna and in which each row represents a respective time segment, each transmission matrix generated based on a transmission matrix representing a previously transmitted transmit baseband signal and input data.

13. The method of claim 12, wherein each receive sequence is a linear combination of said transmit sequences.

14. The method of claim 12, wherein each transmission matrix is proportional to a matrix having orthonormal columns.

15. The method of claim 12, wherein each transmission matrix is generated from a data matrix selected from a set of data matrices and said transmission matrix representing a previously transmitted baseband signal, each data matrix corresponding to a different data sequence of a predetermined length such that said set of data matrices represent all possible data sequences of said predetermined length.

16. The method of claim 15, wherein each transmission matrix is generated by pre-multiplying said transmission matrix representing a previously transmitted baseband signal by said selected data matrix to obtain a new transmission matrix, said selected data matrix corresponding to data of said predetermined length for transmission.

17. The method of claim 11, wherein each reception matrix depends on one of a set of data matrices representing said data encoded therein pre-multiplied by said previous reception matrix, each data matrix in said set of data matrices corresponding to a different data sequence of a predetermined length such that said set of data matrices representing data sequences of said predetermined length.

18. The method of claim 17, wherein each data matrix is proportional to a matrix having orthonormal columns.

19. The method of claim 18, wherein said set of data matrices forms at least part of a group such that multiplying any two data matrices from said number of data matrices results in another data matrix in said set of data matrices.

20. The method of claim 19, wherein said set of data matrices are derived from a generator matrix.

21. The method claim 20, wherein each of said data matrices is a power of said generator matrix.

22. The method of claim 21, wherein said generator matrix is a diagonal matrix.

23. The method of claim 17, wherein said set of data matrices is a set from a plurality of sets providing a highest transmission quality out of said plurality of sets.

24. The method of claim 17, wherein said processing step correlates each data matrix with said previous reception matrix and said reception matrix representing a current receive baseband signal, and outputs said data sequence corresponding to said data matrix having a highest correlation with said reception matrix.

25. The method of claim 24, wherein said processing step calculates a correlation result according to the following equation, $$\|X_{\tau-1} + VX_\tau\|$$

for each data matrix V, where $\|*\|$ represents the Frobenius Norm of $*$, $X_\tau$ represents said reception matrix of said receive baseband signal being processed, $X_\tau$ and $X_{\tau-1}$ represents said reception matrix representing said previously received receive baseband signal; and said processing step outputs said data sequence corresponding to said data matrix having a highest correlation result.

26. The method of claim 17, wherein said receive baseband signals are related to each other as follows, $$X = VX_{\tau-1} + \sqrt{2}W_\tau$$

where $\tau$ represents an order of reception, $X_\tau$ represents said reception matrix of said receive baseband signal being processed, $X_{\tau-1}$ represents said reception matrix representing said previously received receive baseband signal, and V represents said data matrix, and $W_\tau$ represent noise.

27. A method of wireless differential communication, comprising:

receiving receive carrier-level signals, each of which is formed from transmit carrier-level signals transmitted from a multiple transmitter antenna array passing through a channel, using at least one receiver antenna, said transmit carrier-level signals were formed from a plurality of transmit baseband signals, each transmit baseband signal including one or more transmit sequences, in time, of complex numbers, each transmit sequence having been transmitted from a respective antenna of said multiple transmitter antenna array, each transmit baseband signal being representable as a transmission matrix in which each column represents a respective transmitter antenna and each row represents a respective time segment, each transmission matrix generated based on a transmission matrix representing a previously transmitted transmit baseband signal and input data;

demodulating said receive carrier-level signals to form a plurality of receive baseband signals; and processing said receive baseband signals to obtain data represented thereby.

* * * * *